April 16, 1968   N. V. WAUBKE ET AL   3,378,403
METHOD AND APPARATUS FOR REGENERATING A FUEL
CELL ELECTROLYTE BY ELECTRODIALYSIS
AND REMOVING EXCESS WATER
Filed Sept. 19, 1962   5 Sheets-Sheet 1

INVENTORS
NILS VALERIAN WAUBKE
AUGUST WINSEL
EDUARD JUSTI

AGENT

INVENTORS
NILS VALERIAN WAUBKE
AUGUST WINSEL
EDUARD JUSTI

AGENT

United States Patent Office 3,378,403
Patented Apr. 16, 1968

3,378,403
METHOD AND APPARATUS FOR REGENERATING A FUEL CELL ELECTROLYTE BY ELECTRODIALYSIS AND REMOVING EXCESS WATER
Nils V. Waubke, August Winsel, and Eduard Justi, Braunschweig, Germany, assignors to Varta Aktiengesellschaft, Hagen, Westphalia, and Siemens Aktiengesellschaft, Berlin and Erlangen, Germany, both corporations of Germany
Filed Sept. 19, 1962, Ser. No. 224,635
Claims priority, application Germany, Sept. 22, 1961, A 38,387
23 Claims. (Cl. 136—86)

The present invention relates to a method and apparatus combined into a system for removing from a fuel cell electrolyte the excess water formed by the electrochemical reaction of a hydrogen-containing fuel in the electrode chamber and for regenerating the electrolyte.

In a fuel cell containing an aqueous alkali metal solution electrolyte in its electrode chamber, hydrogen or a hydrogen-containing fuel is supplied to the anode and an oxygen-containing gas is supplied to the cathode. The electrochemical reaction of the fuel at the anode produces water and thereby constantly dilutes the electrolyte. This reaction water must be removed and alkali metal cations must be constantly supplied to the electrolyte to maintain the efficiency of the fuel cell operation.

In the system of the present invention, an electrodialysis chamber is placed into communication with the electrode chamber, the alkali metal solution electrolyte is circulated through the electrode chamber of the fuel cell and the anode compartment of the electrodialysis chamber is separated from the circulating electrolyte by a cation exchanger membrane. A carbonate solution of the alkali metal is continuously circulated through the anode compartment and its alkali metal cations are transferred by electrodialysis through the membrane to the electrolyte. Excess electrolyte diluted by the reaction water is transferred to the continuously circulating carbonate solution and then removed therefrom, preferably by evaporation at room temperature.

The alkali metal ions $M^{n+}$ in the electrolyte and in the carbonate may be lithium, sodium and potassium. These ions are transferred from the anode compartment into the electrolyte through the cation exchanger membrane by electrodialysis so that the dilution of the electrolyte, due to the constantly forming reaction water, is balanced by the constant supply of cations to the electrolyte.

In one embodiment of the invention, the electrode chamber of the fuel cell constitutes the cathode compartment of the electrodialysis chamber, the cation exchanger membrane separating the electrode chamber from the anode compartment of the electrodialysis chamber and the cathode of the fuel cell constituting the cathode for the electrodialysis while an anode is arranged in the anode compartment.

In another embodiment of the invention, an electrodialysis chamber completely separated from the fuel cell is provided, the cation exchanger membrane separating the electrodialysis chamber into a cathode and an anode compartment, with a cathode and an anode arranged in the respective compartments. The electrolyte from one fuel cell or a series of fuel cells is circulated through the cathode compartment and the carbonate solution is circulated through the anode compartment, with the alkali metal cations being transferred from the anode into the cathode compartment by electrodialysis.

During the electrodialysis, free acid is produced in the anode compartment of the electrodialysis chamber. Therefore, the anode must be of a noncorrosive material, preferably a noble metal, such as a palladium electrode on a silver support grid. Also, if either the supporting grid or the hydrogenation catalyst of the electrodialysis anode contains any but noble metals, the carbonate content may deleteriously affect the chemical stability and the catalytic-activity of the anode.

In conventional alkaline electrolyte regeneration systems, the reaction water had to be evaporated at elevated temperatures in an atmosphere protected from the air so as to avoid the damaging absorption of carbon dioxide by the alkaline electrolyte. In the system of the present invention, the electrodialysis cell is protected from damaging effects of the alkaline electrolyte and the reaction water may be removed at room temperature and under free air access.

Since reaction water is transferred to the alkali metal carbonate solution circulating through the anode compartment, the hydroxyl ions supplied to the carbonaate solution serve to neutralize the carbonic acid produced in the anode compartment during electrodialysis, according to the following equation:

In this manner, the electrolyte is effectively regenerated and, at the same time, the electrodialysis anode is protected against acid corrosion.

The above and other objects, advantages and features of this invention will be more fully understood by reference to the following detailed description of certain preferred embodiments thereof, taken in conjunction with the accompanying schematic drawing wherein.

Figure 1:
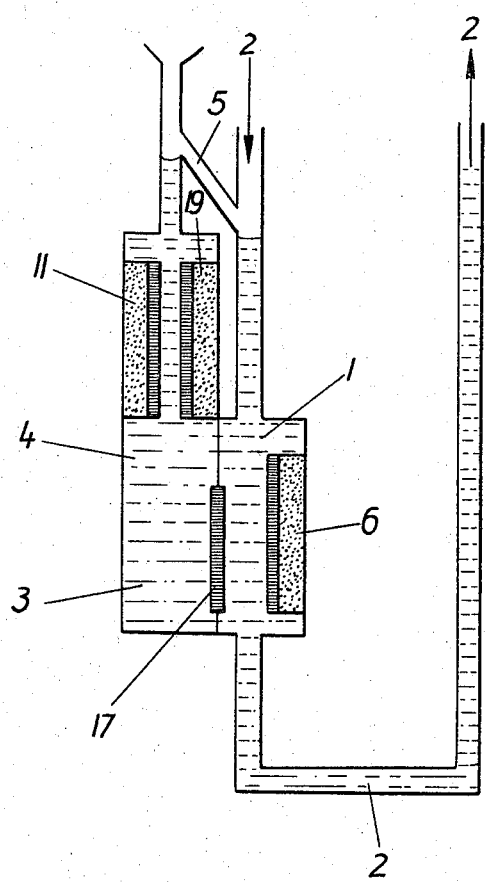
FIG. 1 illustrates one embodiment of the electrolyte regeneration system of the invention.

Referring first to FIG. 1, there is schematically shown a fuel cell comprising an electrode chamber 4 filled with an alkali metal solution electrolyte 3. The usual catalytic anode 11 and cathode 19 are arranged in the electrode chamber of the fuel cell and are respectively supplied with any convention hydrogen-containing fuel, such as hydrogen gas or a suitable hydrocarbon, and oxygen or an oxygen-containing gas. The fuel may be, if desired, a liquid or solid hydrogen-containing substance dissolved or suspended in the electrolyte. In this case, the fuel reaction products in the electrolyte are removed therefrom together with the reaction water.

In the illustrated electrolyte regeneration system, alkali metal cations are constantly supplied to the electrolyte in the electrode chamber by electrodialysis. For this purpose, an auxiliary container defining an anode compartment 1 is mounted next to the electrode chamber of the fuel cell and separated therefrom by a cation exchanger membrane 17.

Any useful and commercially available cation exchanger may be used, including cross-linked polyelectrolytes, such as polystyrene base cation exchange resins. Effective cation exchangers are "Permutit" C 10 and C 20, produced by The Permutit Co., of New York, N.Y. We may also use "Amberlite" cation exchangers produced by Rohm & Haas Co., of Philadelphia, Pa., such as "Amberlite" IR–112, IR–120.

A solution 2 of the carbonate of the alkali metal M of the electrolyte is circulated through the anode compartment 1 and the cations $M^{n+}$ in this solution are transferred through the cation exchanger membrane by electrodialysis into the electrolyte 3 in electrode chamber 4.

In the electrodialysis the fuel cell cathode 19 serves as counter-electrode for anode 6, when a load is connected to the fuel cell.

A constricted overflow conduit 5 places the anode compartment of the electrodialysis chamber in communication with the electrode chamber of the fuel cell and the excess electrolyte diluted by the reaction water is transferred from the electrode chamber to the circulating carbonate solution through the overflow conduit 5. The water is then removed from the circulating carbonate solution, preferably by evaporation at room temperature and in the air.

Figure 2:
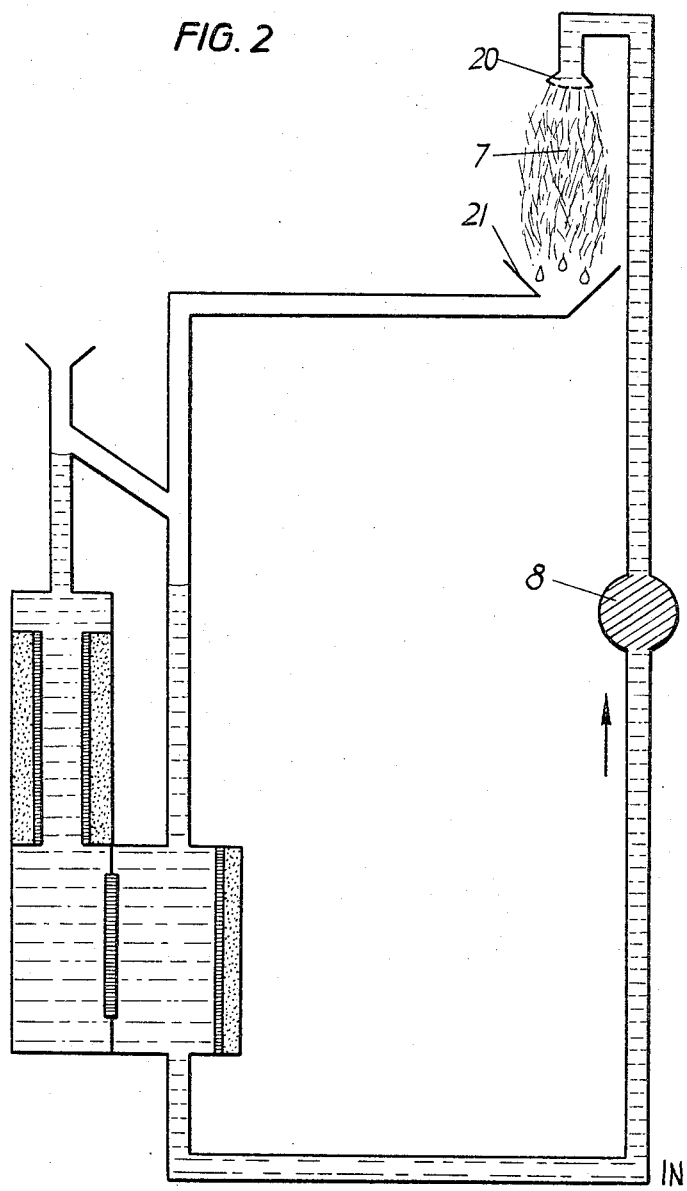
FIG. 2 shows a modification of the system of FIG. 1.

One means for circulating the carbonate solution and removing water therefrom in the general system of FIG. 1 is shown in FIG. 2. All elements neither identified nor described in connection with this figure are identical with those of FIG. 1. As shown a positive displacement pump 8 is mounted in the carbonate solution circulating conduit to pump the solution through the anode compartment. Pump 8 moves the carbonate solution containing the electrolyte reaction water from the anode compartment to a shower head 20 whence the solution descends by gravity in fine streams over an evaporation device 7 constituted by a multiplicity of sheet metal elements providing a large surface over which the solution cascades down into a funnel 21 and moves back through the conduit into the anode compartment.

If desired, the positive displacement pump 8 may be replaced by a thermosiphon arrangement for circulating the solution through the anode compartment and past the evaporation device 7.

Figure 3:
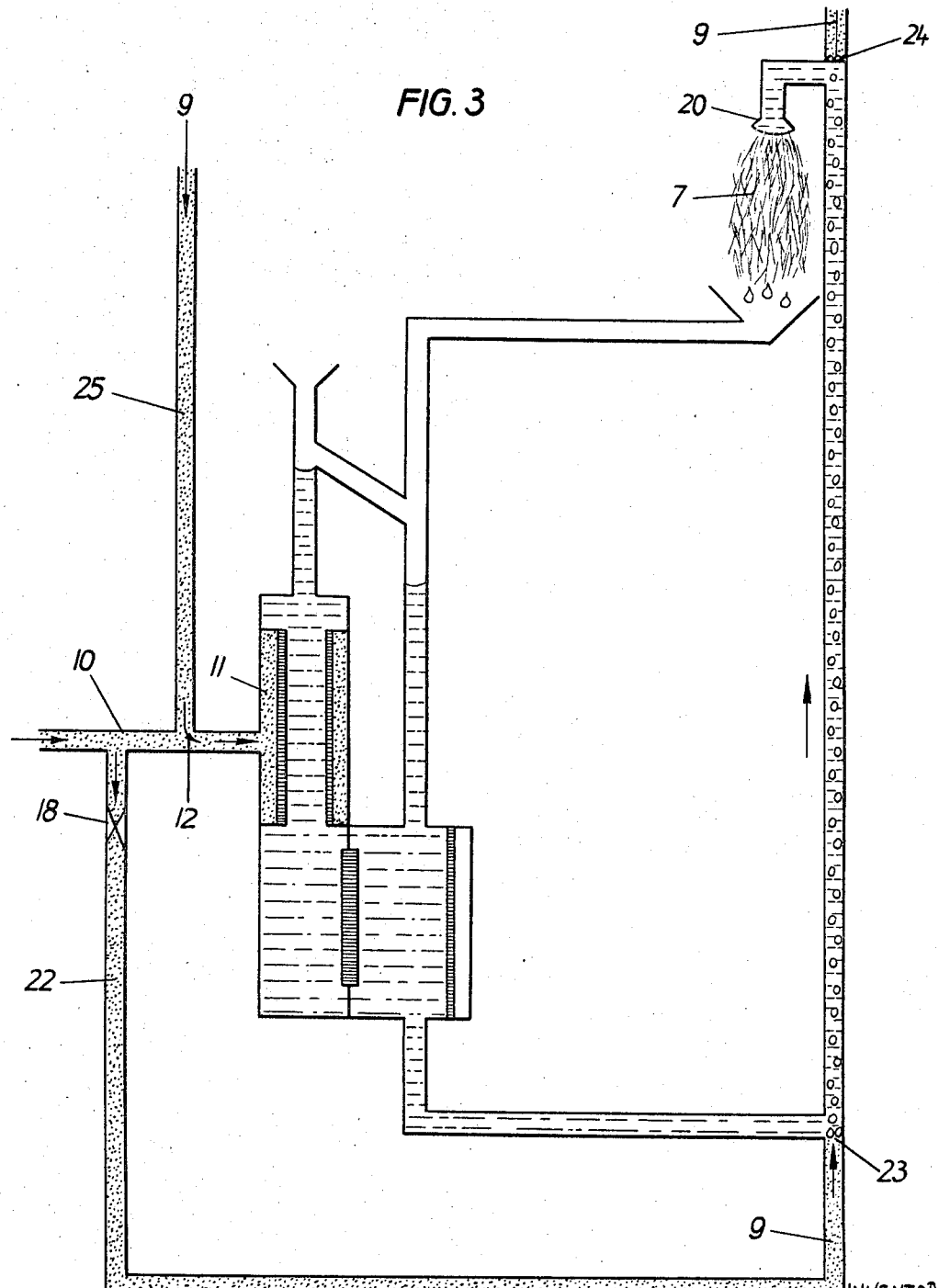
FIG. 3 shows another modification thereof.

FIG. 3 illustrates a preferred carbonate solution circulation means in the system of FIG. 1 (all unidentified elements being again identical with those of FIG. 1). Here, the carbonate solution is circulated by a gas lift pump. In the illustrated embodiment, the gas for the gas lift pump is derived from the fuel gas supply for the fuel cell.

As shown, the anode 11 of the fuel cell is supplied with hydrogen or a hydrogen-containing gas 9 through a conduit 10 leading to anode 11. A branch conduit 25 is connected to the main fuel conduit at point 12. Another branch conduit 22 leads from conduit 10 to a gas inlet port 23 in the conduit for carbonate solution 2. When valve 18 in conduit 22 is opened, gas 9 will pass through branch conduit 22 and will enter the carbonate solution carrying conduit at inlet port 23 to lift the solution toward shower head 20. At the top of the carbonate solution carrying conduit and after it has lifted the solution through the conduit, the fuel gas 9 leaves the conduit through gas outlet port 24. It is then directed to a drying installation (not shown) where it may also be purified to remove any carbon dioxide carried along from the carbonate solution. The purified fuel gas is then returned to the supply conduit 10 for the fuel cell anode. As shown, this return conduit 25 enters the supply conduit 10 between the anode 11 and the branch conduit 18 so that the pressure differential between point 12 and the branch 22 causes the positive gas flow which produces the carbonate solution lift.

The electrolyte regeneration system may be operated more or less continuously and automatically when the electrical current required for the electrodialysis is obtained from the fuel cell circuit, a portion of the fuel cell output being used for initiating and maintaining the electrodialysis.

Figure 4:
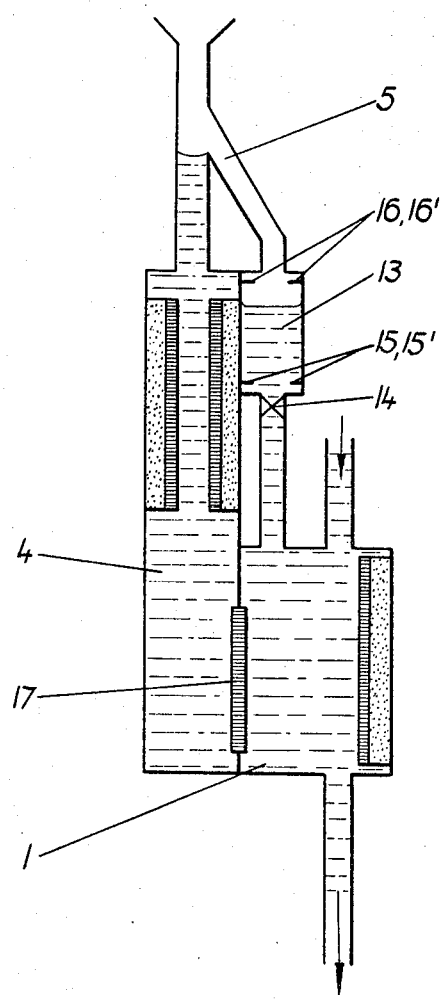
FIG. 4 illustrates yet another modification.

Another continuous and automatic control for the operation of the electrolyte regeneration system is diagrammatically shown in FIG. 4, all non-identified parts being against the same as in FIG. 1. In this modification, a storage chamber 13 is arranged between the overflow conduit 5 and the anode compartment 1 of the electrodialysis chamber. Solenoid valve 14 periodically permits transfer of the electrolyte from the storage chamber into the anode compartment whereby the dilute electrolyte is transferred to the circulating carbonate solution periodically instead of continuously, being periodically stored in chamber 13 when the valve is closed. The regeneration is controlled by an electrical control circuit having two spaced contact pairs 15, 15′, and 16, 16′ in the storage chamber.

During the electrochemical reaction in the fuel cell, electrical energy is produced and water is formed in the electrode chamber concomitantly therewith. When sufficient reaction water has been formed to overflow the electrode chamber and pass through overflow conduit 5 into the storage chamber until the same has been filled with dilute electrolyte, the electrolyte will connect the contacts 16, 16′ of the upper pair of contacts, thus closing the electrical control circuit and causing solenoid valve 14 to be opened. This will cause the dilute electrolyte to be emptied into the anode compartment and pass into the circulating carbonate solution until the storage chamber is drained and the lower pair of contacts 15, 15′ is no longer connected by electrolyte. This causes a relay (not shown) to close the solenoid valve again so that the storage chamber may be filled again with overflowing dilute electrolyte from the fuel cell. The electrical control circuit initiates the electrodialysis simultaneously with the closing of contacts 16, 16′ and the concomitant opening of the solenoid valve 14 and constant current density in the circuit maintains the electrodialysis through a time relay in the circuit until a sufficient amount of alkali metal cations have been transferred from the anode compartment into the electrolyte through membrane 14 to regenerate the electrolyte. This required electrolyte regeneration amount of cations and the corresponding time span of the electrodialysis may be readily calculated from the volume of the storage chamber between the contact pairs 15, 15′ and 16, 16′.

Figure 5:
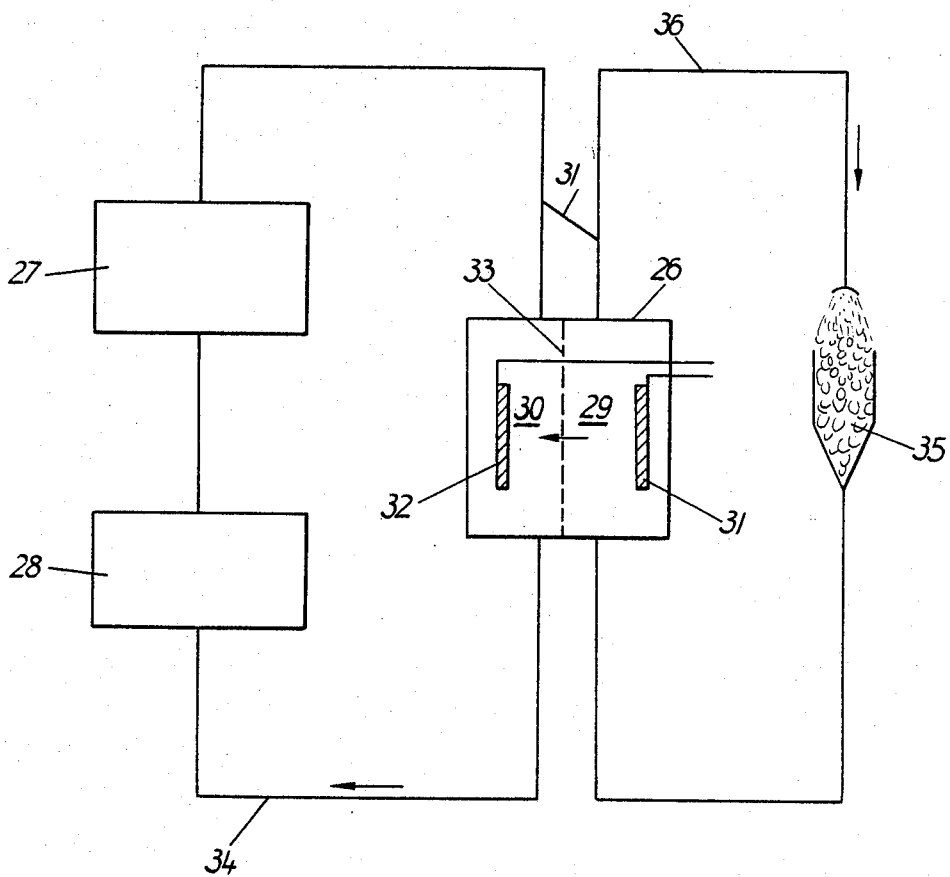
FIG. 5 shows another embodiment of the electrolyte regeneration system.

FIG. 5 illustrates schematically another embodiment of the present invention wherein the electrodialysis chamber is completely separated from the fuel cell or fuel cells whose electrolyte is to be regenerated. In this embodiment, a single electrodialysis chamber 26 is designed to operate with a plurality of fuel cells, two such cells 27 and 28 being shown. Obviously, only a single fuel cell could be connected to the electrodialysis chamber or more than two such cells could be connected in series.

As shown, the electrodialysis chamber is separated by a cation exchanger membrane 33 into a cathode compartment 30 and an anode compartment 29. A cathode 32 is mounted in the cathode compartment and an anode 31 is mounted in the anode compartment of the electrodialysis chamber. The dilute electrolyte from the fuel cells is circulated through the cathode compartment 30 and, after being regenerated therein, returns to the electrode chambers of the fuel cells through conduit 34. The carbonate solution is circulated through the anode compartment in a manner similar to that of the previously described system, an evaporation device 35 being mounted in the circulation conduit to permit the water to evaporate from the carbonate solution, an overflow conduit 37 transferring dilute electrolyte to the circulating carbonate solution.

As previously pointed out, the electrolyte regeneration system of this invention has the advantage that the reaction water may be evaporated at room temperature and in the atmosphere. Furthermore, carbon dioxide entering the electrolyte from the air is constantly removed therefrom in the anode compartment of the electrodialysis chamber during electrodialysis.

The following example illustrates the regeneration of a 6 N potassium hydroxide electrolyte which is conventionally used in hydrogen fuel cells.

A 6 N potassium hydroxide solution (weight/liter=1.256 kg.) contains 6 gram equivalents potassium per 57.11 mole water. This corresponds to 0.0525 gram equivalent of potassium/gram equivalent of water. Therefore, when the electrochemical reaction in the fuel cell produces 96,500 coulomb, the concentration of the electrolyte is maintained by transferring by electrodialysis through the cation exchanger membrane $5.25 \times 10^{-2}$ gram equivalents of potassium.

When a potassium carbonate solution of about the same concentration as that of the potassium hydroxide electrolyte solution is circulated through the anode compartment of the electrodialysis chamber and a "Permutit" C 10 or C 20 cation exchanger membrane is interposed between the electrolyte and the carbonate solution, an apparent selectivity of about 70% may be obtained in the membrane at an ambient operating temperature and a normal current density of about 1 ma./sq. cm. and about 100 ma./sq. cm.

The apparent selectivity reflects the ratio of the actual increment of the cation concentration in the electrolyte to the theoretically calculated increment of cations at the cathode, based on the transferred current. This parameter includes the true selectivity of the membrane, i.e., the ratio of the current transferred by the cations to the total current, and its falsification due to a water current in the direction of the electrolyte. This parameter has been verified by actual measurements.

Under these conditions, the current to be transferred through the membrane rises to $7.5 \times 10^{-2}$ Faradays, i.e., to $7.5 \times 965$ coulomb. Therefore, 7.5% of the current obtained from the fuel cell must be returned to the system for the purpose of the electrolyte regenerating dialysis.

A hydrogen fuel cell with a double skeleton catalyst electrode according to U.S. Patent No. 2,928,891 and operated at room temperature with a current density of 150 ma./sq. cm. produces a voltage of about 700 mv. If the reversible electrodialysis in the described regeneration system (6 N KOH/6 N $K_2CO_3$) is also operated at room temperature at an anode current density of 10 ma./sq. cm.—which corresponds to about 7% of the amperage of the fuel cell—a total voltage of about 700 mv. is necessary. If the diffusion electrodes in the fuel cell and in the electrodialysis chamber have the same surface, the electromotive force at a technically useful amperage suffices to produce the necessary voltage for the regeneration of the electrolyte in the described system.

The electrodialysis is initiated in the manner described and illustrated in connection with FIG. 4. It is also possible to connect the electrodialysis circuit directly to the main circuit of the fuel cell. According to the above calculations, when the current density in the main circuit is 150 ma./sq. cm., about 7% of the current is branched off for use in the electrodialysis circuit.

While the invention has been described in connection with certain now preferred embodiments, it will be clearly understood that many variations and modifications may occur to the skilled in the art, particularly after benefiting from the present teaching, without departing from the spirit and scope thereof, as defined in the accompanying claims.

We claim:

1. A method of removing excess water from an electrolyte contained in the electrode chamber of a fuel cell, said electrolyte consisting of an aqueous alkali metal solution and said excess water being formed by the electrochemical reaction of a hydrogen-containing fuel in the electrode chamber, comprising the steps of placing an electrodialysis chamber in communication with said electrode chamber, said electrodialysis chamber including an anode compartment, separating said anode compartment from said electrolyte in said electrode chamber by a cation exchanger membrane, continuously circulating a carbonate solution of said alkali metal through the anode compartment, transferring alkali metal cations from said carbonate solution through the membrane into the electrolyte by electrodialysis, transferring excess electrolyte diluted by the water formed in said reaction to the continuously circulating carbonate solution, continuously separating a portion of the water from said solution and removing said portion of water.

2. The method of claim 1, including the step of removing the water from the circulating carbonate solution by evaporation.

3. The method of claim 1, including the step of circulating the electrolyte through a plurality of said fuel cells.

4. The method of claim 1, including the step of pumping said carbonate solution the anode compartment.

5. The method of claim 1, including the step of thermo-siphoning said carbonate solution through the anode compartment.

6. The method of claim 1, including the step of pressing said carbonate solution through the anode compartment by a gas stream under pressure.

7. The method of claim 6, including the step of deriving said gas stream from the fuel supplied to the cell.

8. The method of claim 6, including the step of deriving the gas stream from the oxygen-containing gas supplied to the cell.

9. The method of claim 1, including the step of transferring said dilute electrolyte to the carbonate solution through an overflow.

10. The method of claim 1, including the step of removing the water from the circulating carbonate solution by evaporation at room temperature.

11. The method of claim 10, including the step of distributing the circulating carbonate solution over a large surface to facilitate said evaporation at room temperature.

12. The method of claim 1, including the steps of periodically storing said dilute electrolyte and then transferring the stored portions of the electrolyte to the circulating carbonate solution.

13. The method of claim 1, including the steps of transferring said dilute electrolyte from the electrode chamber into a storage chamber through an overflow, storing the electrolyte in said storage chamber, and periodically transferring the electrolyte from the storage chamber into the circulating carbonate solution.

14. The method of claim 1, including the step of initiating and maintaining the electrodialysis by using a portion of the electric current produced by the fuel cell.

15. An apparatus for regenerating an electrolyte contained in a housing defining an electrode chamber of a fuel cell, said electrolyte consisting of an aqueous alkali metal solution and excess water being formed by the electrochemical reaction of a hydrogen-containing fuel in the electrode chamber, comprising a separate housing adjacent the electrode chamber and defining an anode compartment of an electrodialysis chamber, an anode and a cathode in said electrode chamber, an anode in said anode compartment, the electrode chamber of the fuel cell constituting a cathode compartment in said electrodialysis chamber and the fuel cell cathode constituting the cathode for the electrodialysis, a cation exchanger membrane separating the anode compartment from said electrode chamber, a supply of carbonate solution of said alkali metal connected to the anode compartment, means for continuously circulating the carbonate solution through the anode compartment, a conduit means for transferring excess electrolyte diluted by the water formed in said reaction to the circulating carbonate solution and means for removing said water from the solution.

16. The apparatus of claim 15, wherein said water removing means comprises a large-surface evaporation device arranged to receive the circulating carbonate solution and to evaporate the water at room temperature and in the atmosphere.

17. The apparatus of claim 15, wherein said circulating means is a pump.

18. The apparatus of claim 15, wherein said circulating means is a gas lift pump.

19. The apparatus of claim 18, wherein said gas lift pump receives its gas supply from the fuel gas supply to the cell.

20. The apparatus of claim 15, wherein said excess electrolyte conduit means is an overflow conduit leading from the fuel cell.

21. The apparatus of claim 20, comprising a further container defining a storage chamber, said overflow conduit leading to said storage chamber, a further conduit leading from said storage chamber to the anode compartment, and periodically operatable valve means in said further conduit for transferring dilute electrolyte from the storage chamber to the anode compartment.

22. The apparatus of claim 21, wherein said valve means is a solenoid valve, and further comprising an electrical control circuit, two spaced contacts arranged in said circuit in the storage chamber, the circuit being closed and the valve being correspondingly opened when the electrolyte reaches a level in said storage chamber whereat the two spaced contacts are connected by the electrolyte, and a time relay in said circuit for maintaining the electrodialysis.

23. An apparatus for regenerating an electrolyte contained in a housing defining an electrode chamber of a fuel cell, said electrolyte consisting of an aqueous alkali metal solution and excess water being formed by the electrochemical reaction of a hydrogen-containing fuel in the electrode chamber, comprising a separate housing defining an electrodialysis chamber, a cation exchanger membrane separating the electrodialysis chamber into a cathode and an anode compartment, a cathode arranged in the cathode compartment and an anode arranged in the anode compartment, a conduit for circulating the electrolyte from at least one of said fuel cells through the cathode compartment, a supply of a carbonate solution of said alkali metal connected to the anode compartment, means for continuously circulating the carbonate solution through the anode compartment, a conduit means for transferring excess electrolyte diluted by the water formed in said reaction to the circulating carbonate solution and means for removing the water from the solution.

No references cited.

ALLEN B. CURTIS, *Primary Examiner.*

WINSTON A. DOUGLAS, *Examiner.*

H. FEELEY, *Assistant Examiner.*